(12) United States Patent
Ferracin et al.

(10) Patent No.: US 6,877,582 B2
(45) Date of Patent: Apr. 12, 2005

(54) STEERING EQUIPMENT FOR VEHICLES

(75) Inventors: Paolo Ferracin, Modena (IT); Marcello Mongiardo, Modena (IT); Franco Mazzucchi, Modena (IT); Alessandro Scotti, Modena (IT)

(73) Assignee: Case, LLC, Racine, WI (US)

( * ) Notice: Subject to any disclaimer, the term of this patent is extended or adjusted under 35 U.S.C. 154(b) by 0 days.

(21) Appl. No.: 10/382,162

(22) Filed: Mar. 5, 2003

(65) Prior Publication Data

US 2004/0173399 A1 Sep. 9, 2004

(51) Int. Cl.[7] .................................................. B62D 1/04
(52) U.S. Cl. ............................................ 180/417; 180/78
(58) Field of Search ........................ 180/78, 403, 417; 280/771, 773, 779

(56) References Cited

U.S. PATENT DOCUMENTS

| | | | |
|---|---|---|---|
| 1,792,713 A | | 2/1931 | Schmelzkopf |
| 2,778,898 A | | 1/1957 | Lenning |
| 5,203,421 A | * | 4/1993 | Ueno et al. ............... 180/417 |
| 5,791,433 A | * | 8/1998 | Murakami et al. ......... 180/417 |
| 6,237,437 B1 | | 5/2001 | Takahashi |
| 6,462,289 B1 | | 10/2002 | Kubota |
| 6,490,861 B1 | | 12/2002 | Biggi et al. |
| 6,538,220 B1 | | 3/2003 | Durocher |
| 6,626,062 B1 | | 9/2003 | Yoshitake et al. |
| 2002/0047255 A1 | | 4/2002 | Baume et al. |

FOREIGN PATENT DOCUMENTS

| | | |
|---|---|---|
| DE | 946870 | 8/1956 |
| DE | 19625966 A1 | 1/1998 |
| DE | 19935089 A1 | 2/2000 |
| DE | 20004953 U1 | 9/2000 |
| EP | 1142773 A2 | 10/2001 |
| EP | 1342641 A3 | 9/2003 |
| EP | 1342638 A3 | 1/2004 |
| JP | 2001-76593 A | 3/2001 |

* cited by examiner

*Primary Examiner*—Lesley D. Morris
*Assistant Examiner*—Matthew Luby
(74) *Attorney, Agent, or Firm*—John William Stader; Collin A. Webb

(57) ABSTRACT

Steering equipment for a work vehicle includes a steering transmission shaft mounted so that the shaft can turn within a steering column, and with a control device for actuating a steering operating unit. The control device includes a reference member, which can move along the transmission shaft and a sensor device fixed to the steering column in a position substantially facing the reference member for detecting a position of the reference member along the transmission shaft. The sensor provides a displacement signal that is used to vary the steering ratio, such as steering speed.

20 Claims, 6 Drawing Sheets

STEERING EQUIPMENT FOR VEHICLES

BACKGROUND OF TEE INVENTION

The present invention relates to steering equipment for work vehicles, and more particularly, to a control device for engaging a steering operating unit, such as a fast steering system for agricultural vehicles.

Known steering units used in agricultural vehicles usually include a steering column having a longitudinal axis, a steering transmission shaft mounted inside the steering column for rotating about the longitudinal axis and a steering wheel mounted on the steering transmission shaft. Additionally, a control device for actuating an operating unit may be provided. The control device may be operable to induce conversion between a "conventional steering mode" and a "fast steering mode" as described in EP-A-1.142.773, now U.S. Published Patent Application No. 2001/0032461 A1.

Generally, the control device is mounted on the steering column and usually includes a reference member, which can move along the longitudinal axis of the steering column. An actuating member is provided which can be operated by the vehicle operator for displacing the reference member along the longitudinal axis. A sensor is provided to detect the position of the reference member along the longitudinal axis. Finally, a connecting mechanism, either mechanical or electrical, is provided for connecting the sensor to the reference member.

The steering unit is designed to control the steering of a pair of wheels of the vehicle, usually by means of a hydraulic steering circuit. The steering circuit enables the steering wheel to rotate about the longitudinal axis even when the wheels have reached their maximum steering angle. Thus, the steering wheel may continue to make an indefinite number of complete rotations, even after full steering lock has been reached.

As a result of this unrestricted rotation of the steering wheel, steering equipment of the above type presents the problem that an actuator for activating another function (such as the "fast steering mode") cannot be readily affixed to the steering wheel for rotation therewith, since the connecting mechanism between the sensor and the reference member could be damaged or become inoperable due to the indefinite or unrestricted steering wheel rotations. Instead, the actuator is connected in a slidable manner to the is steering column underneath the steering wheel. This poses the additional problem of finding an ergonomic position, which is not hidden by the steering wheel.

The problems and drawbacks described above are partially overcome by mounting the actuator on the dashboard of the vehicle, separate from the steering column. In this configuration, however, the vehicle operator must let go of the steering wheel with at least one hand to operate the actuator, which is not recommendable from an ergonomic point of view.

Thus, the purpose of the present invention is to provide steering equipment for work vehicles that overcomes the problems and drawbacks referred to above.

SUMMARY OF THE INVENTION

According to a first aspect of the present invention, steering equipment is provided for a work vehicle including a steering unit having a steering column with a first longitudinal axis, a steering transmission shaft mounted inside the steering column for rotating about the first axis, a steering wheel mounted on the transmission shaft and a control device for actuating a steering operating unit. The control device further includes a reference member disposed on the steering unit to move along the first longitudinal axis, an actuator device for displacing the reference member along the first axis, and a sensor for detecting a position of the reference member along the first longitudinal axis. The sensor is mounted on the steering column in a position substantially facing the reference member.

According to a second aspect of the present invention, steering equipment for a work vehicle includes a steering unit having a steering column with a first longitudinal axis, a steering transmission shaft mounted inside the steering column for rotating about the first axis, a steering wheel mounted on the transmission shaft, and a control device for actuating a steering operating unit. The control device includes a reference member disposed on the steering unit and movable along the first longitudinal axis, an actuating device for displacing the reference member along the first longitudinal axis, and a sensor for detecting a position of the reference member along the first longitudinal axis. The actuating device further includes an actuator wheel having a second longitudinal axis and generally coaxial with the steering wheel. The actuator wheel is operable to move between a resting position, in which the actuator wheel and reference member are substantially coaxial with respect to one another, and an operative position, in which the first and second longitudinal axis form an angle other than zero with respect to one another.

Finally, according to a third aspect of the present invention, steering equipment for work vehicles includes a steering unit having a steering column with a first longitudinal axis, a steering transmission shaft mounted inside the steering column for rotating about the first axis, and a steering wheel mounted on the transmission shaft for controlling the steering of at least one wheel of the vehicle. A hydraulic system is disposed between the steering unit and the vehicle wheel. A control device acts on the hydraulic system for varying a ratio between an angle of rotation of the steering wheel about the first axis and an angle of steering of the vehicle wheel. The control device further includes a reference member disposed on the steering unit and movable along the first axis, an actuator mechanism for moving the reference member along the first axis, and a sensor for detecting a position of the reference member along the first axis. The sensor is mechanically disconnected from the reference member.

BRIEF DESCRIPTION OF THE DRAWINGS

The present invention will now be described further, by way of example, with reference to the accompanying drawings, in which.

DETAILED DESCRIPTION OF THE PREFERRED EMBODIMENTS

Figure 1:
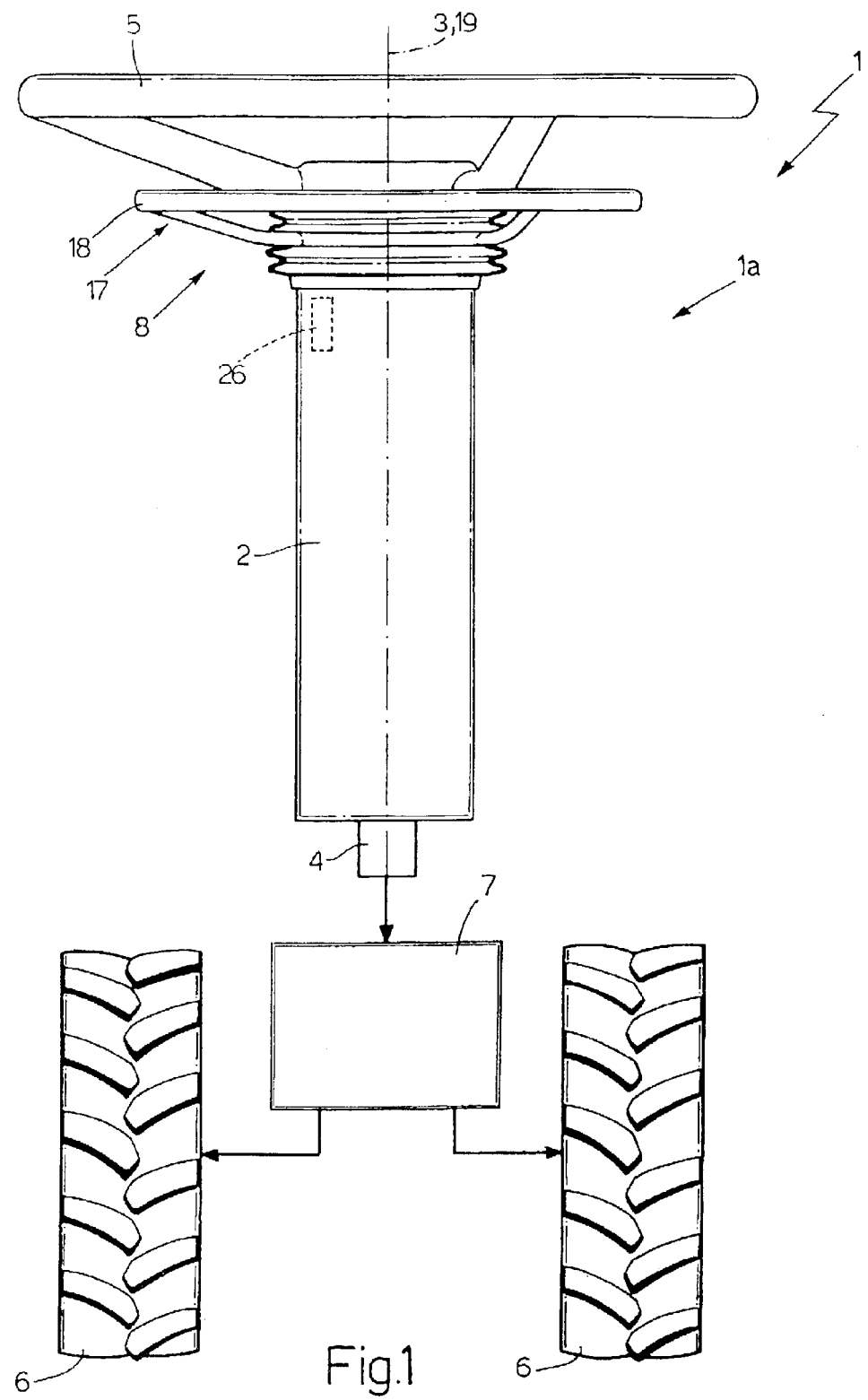
FIG. 1 is a schematic perspective view of a preferred embodiment of the steering equipment of the present invention.

With reference to FIG. 1, the reference number 1 designates, in general, steering equipment for work vehicles, and in particular for agricultural vehicles, such as tractors, combine harvesters and forage harvesters. The steering equipment includes a steering unit 1a, which in turn includes a tubular steering column 2 extending along a first longitudinal axis 3 and connected in known manner to the work vehicle body (not illustrated). A tubular steering transmission shaft 4 is mounted inside the steering column 2 co-axially with respect to the first longitudinal axis 3. A steering wheel 5 is fitted on one end of the transmission shaft 4 for controlling the steering of a pair of wheels 6 by means of a hydraulic unit 7. The hydraulic unit 7 is preferably of the type described in patent application No. EP-A-1.142.773, now U.S. Published Patent Application No. 2001/0032461 A1, the complete disclosure of which is hereby incorporated by reference.

The steering unit 1a includes a control device 8 for controlling the hydraulic unit 7 for varying a steering ratio, i.e. the ratio between the angle of rotation of the steering wheel 5 about the longitudinal axis 3 and the angle of steering of the wheels 6. The steering ratio may vary between a first relatively large value k1, which is characteristic of a first mode of operation, defined as "conventional steering", and a second relatively small value k2, which is characteristic of a second mode of operation, defined as "fast steering".

Figure 2:
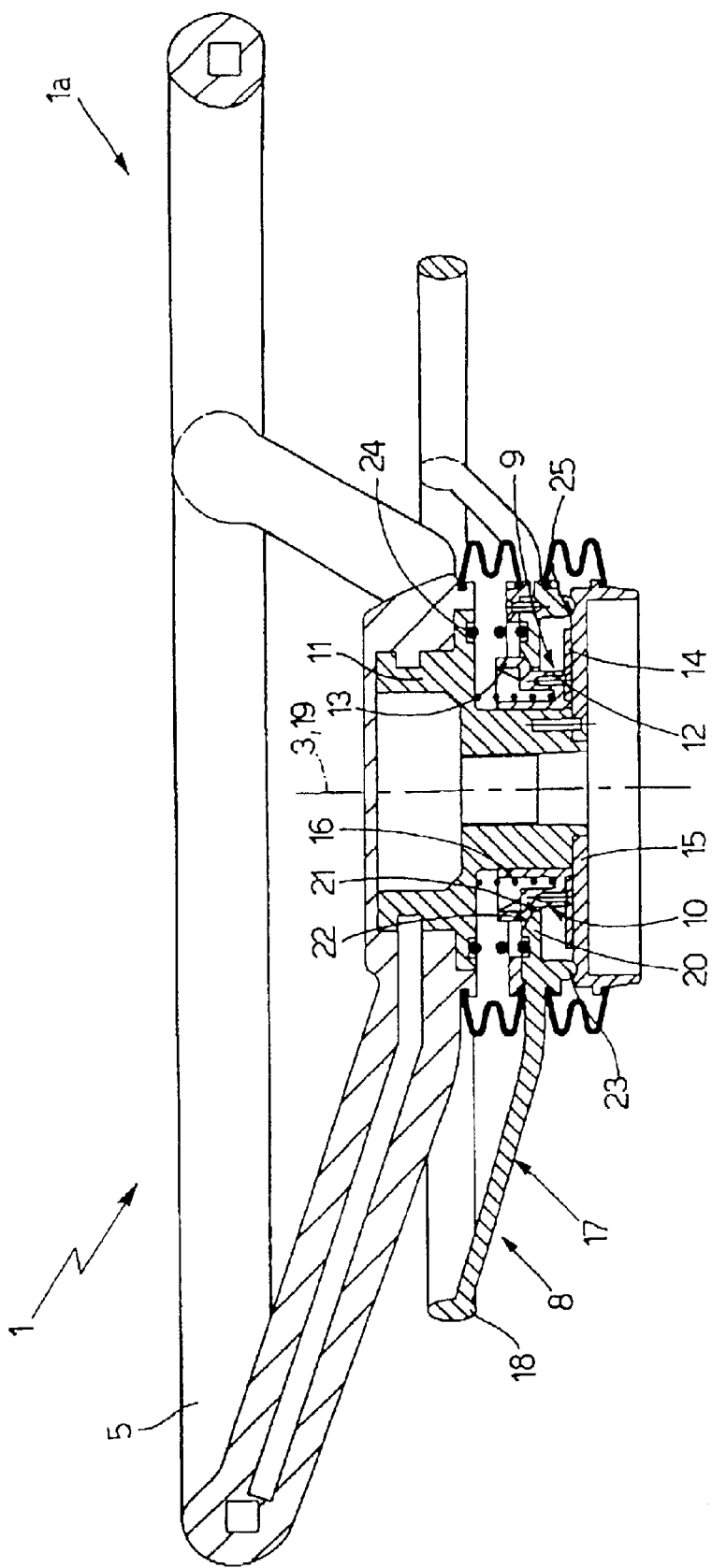
FIG. 2 is a longitudinal sectional view of the equipment of FIG. 1, illustrated in a lower operative position.

With reference to FIG. 2, the control device 8 includes a reference member 9, which has a sleeve 10, which is disposed coaxial to the first longitudinal axis 3. The sleeve 10 is associated with a central hub 11 of the steering wheel 5 in such a way that the sleeve 10 can turn and slide axially on the hub 11. The sleeve 10 has a restricted or narrow bottom portion 12 and a widened top portion 13. A metal annular cup 14 is fixed to one end of the bottom portion 12 of the sleeve 10, orthogonal to the first longitudinal axis 3.

Figure 3:
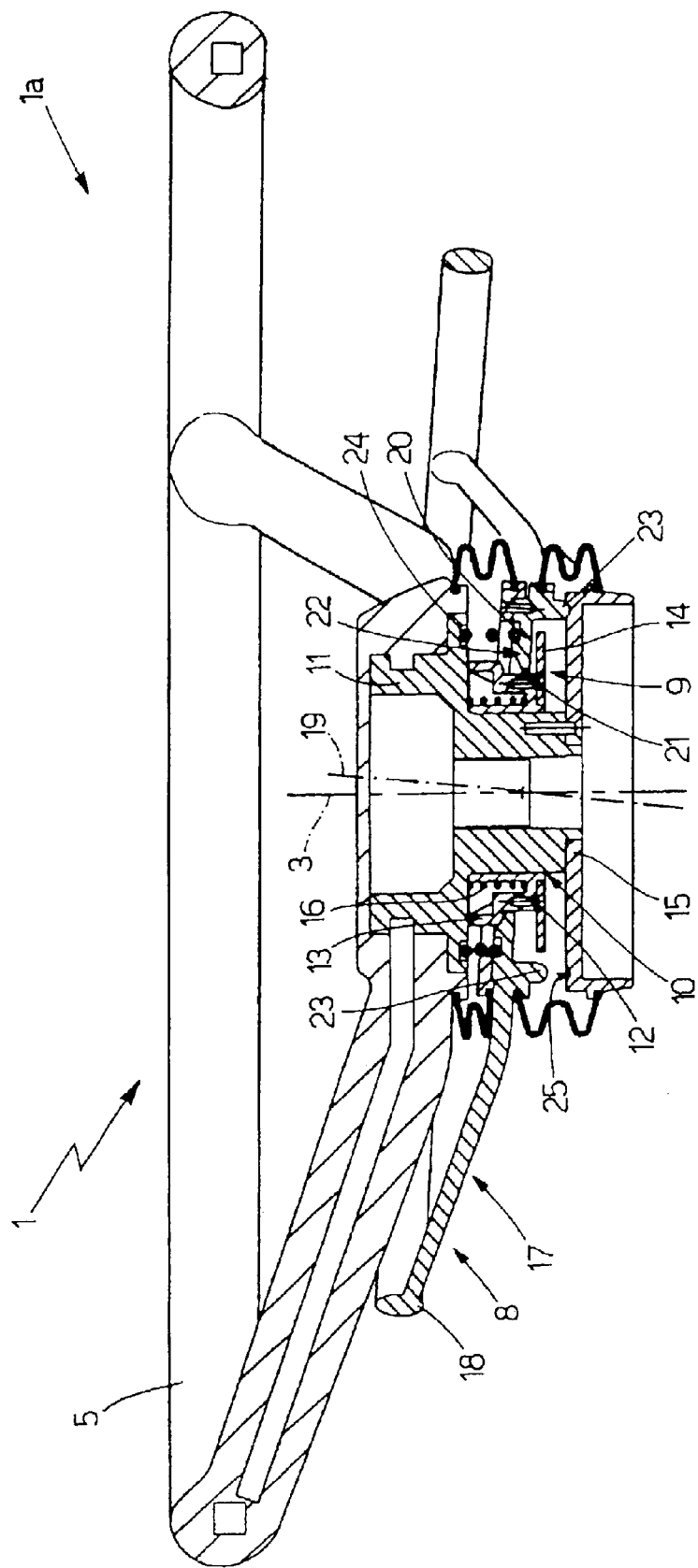
FIG. 3 is a longitudinal sectional view of the equipment of FIG. 1, illustrated in a raised operative position.

The reference member 9 is normally disposed in a lowered position (FIG. 2), in which the cup 14 is disposed in contact with an end-of-travel element such as annular flange 15. The flange 15 extends radially outward from an external surface of the steering wheel central hub 11 and is made of a non-ferromagnetic material (for example, plastic). The cup 14 is urged into contact with the flange 15 by means of a spring 16 that is disposed between the sleeve 10 and the hub 11. The spring 16 is co-axial with respect to the first longitudinal axis 3. The reference member 9 can thus move along the first longitudinal axis 3, under the thrust of an actuating member 17 and against the bias of the spring 16. The reference member 9 can move from the lowered position (FIG. 2) to a raised position (FIG. 3). In the raised position, the cup 14 is offset a given distance from the annular flange 15.

The actuating member 17 includes an actuator wheel 18, which has a second longitudinal axis 19 and is disposed inside the steering wheel 5. The actuator wheel 18 is provided with a second central hub 20, which extends about the steering wheel central hub 11 co-axially with respect to the second longitudinal axis 19. The second central hub 20 has a narrow or restricted bottom portion 21 engaged by the restricted bottom portion 12 of the steering wheel central hub 11. The second hub 20 has a widened top portion 22 having substantially the shape of a truncated cone, that is engaged by the widened top portion 13 of the steering wheel central hub 11.

The second central hub 20 is also provided with a plurality of fixed pin elements 23, which are uniformly distributed circumferentially about the second longitudinal axis 19. The fixed pin elements 23 project axially downward from the central hub 20. The pin elements 23 are under the bias of another spring 24. The spring 24 is disposed between the two central hubs 11 and 20. Normally the pins 23 engage corresponding seats 25 formed in the top surface of the flange 15.

The actuator wheel 18 is able to move against the bias of the spring 24 under a force that is asymmetrical with respect to the first longitudinal axis 3. The asymmetrical force may be exerted, for example, by one hand of the vehicle operator. The actuator wheel 18 moves from a lower or resting position (FIG. 2), in which the steering wheel 5 and actuator wheel 18 (as well as the first axis 3 and the second axis 19) are coaxial with respect to one another, to a raised or operative position (FIG. 3), in which the first longitudinal axis 3 forms an angle with respect to the second longitudinal axis 19, i.e. an angle other than 0°.

With reference to FIG. 3, when the actuator wheel 18 is moved by the vehicle operator into the operative position against the bias of the spring 24, the widened top portion 22 of the second central hub 20 co-operates with the widened top portion 13 of the sleeve 10 to displace the cup 14 into a raised position against the bias of the spring 16. With reference to FIG. 2, when the actuator wheel 18 is released by the vehicle operator, the actuator wheel 18 is displaced into the resting position under the bias of the spring 24. The cup 14 is normally disposed in the lowered position under the bias of the spring 16.

The control device 8 further includes a magnetic proximity sensor 26 (FIG. 1), which is fixed to the steering column 2 and is designed to detect the displacement of the cup 14 along the longitudinal axis 3 between the lowered position and the raised position. An electronic control unit (not illustrated) is designed to control operation of the hydraulic unit 7 in response to a signal from the proximity sensor 26, to selectively choose between "conventional steering" and "fast steering".

Figure 4:
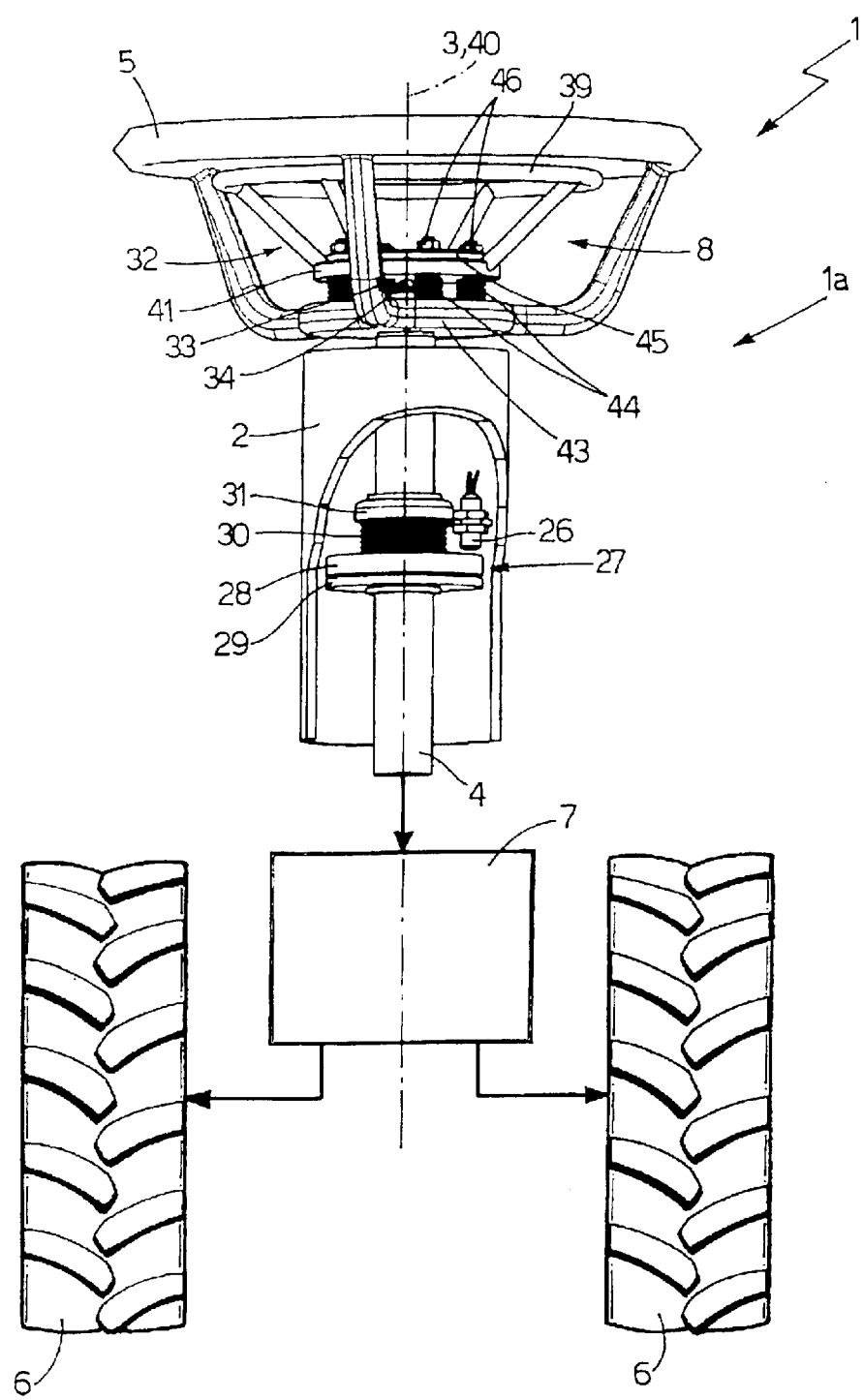
FIG. 4 is a schematic perspective view, partially in cross-section, of a second embodiment of the steering equipment of the present invention.
Figure 5:
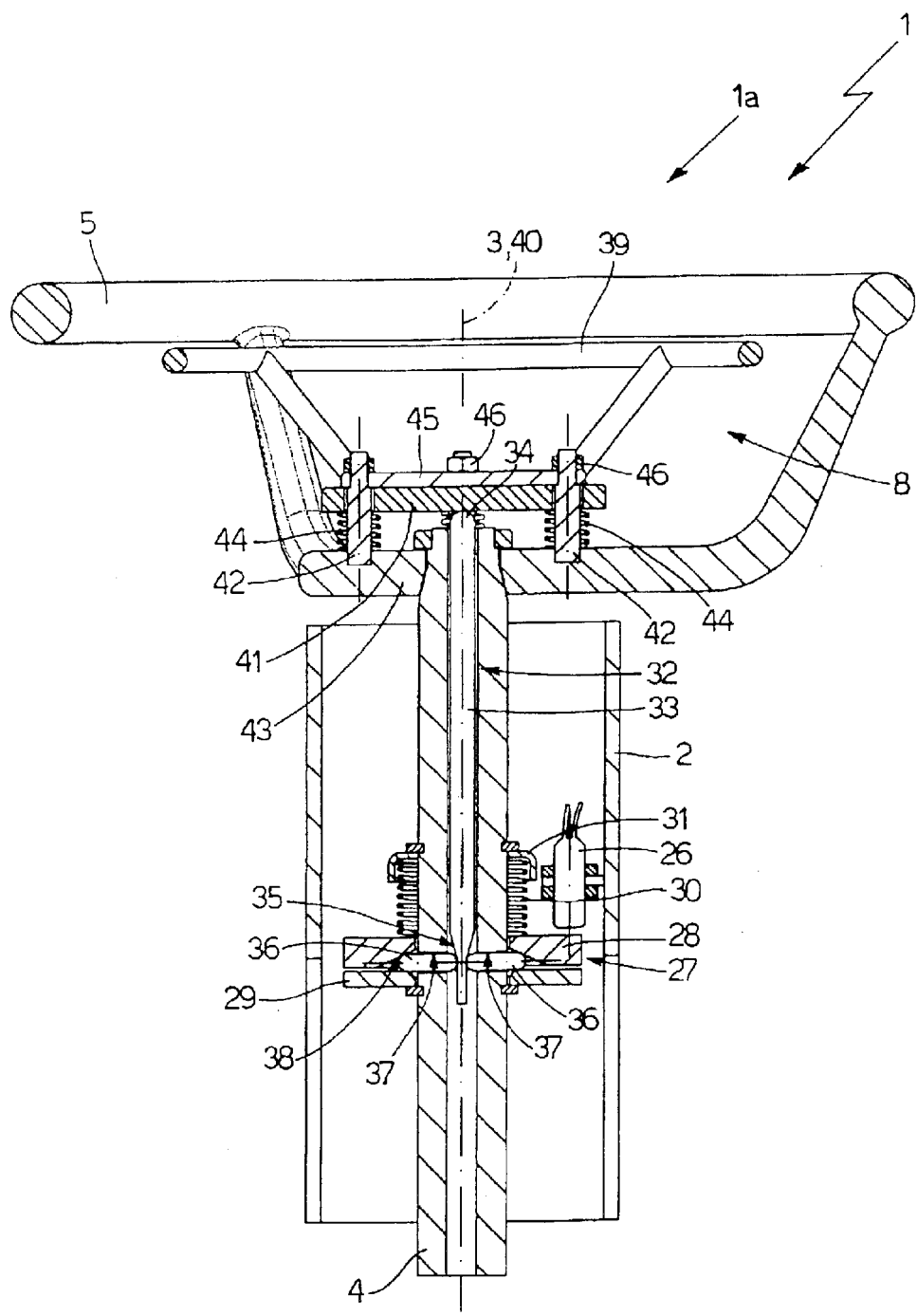
FIG. 5 is a longitudinal sectional view of the equipment of FIG. 4, illustrated in a lower operative position.
Figure 6:
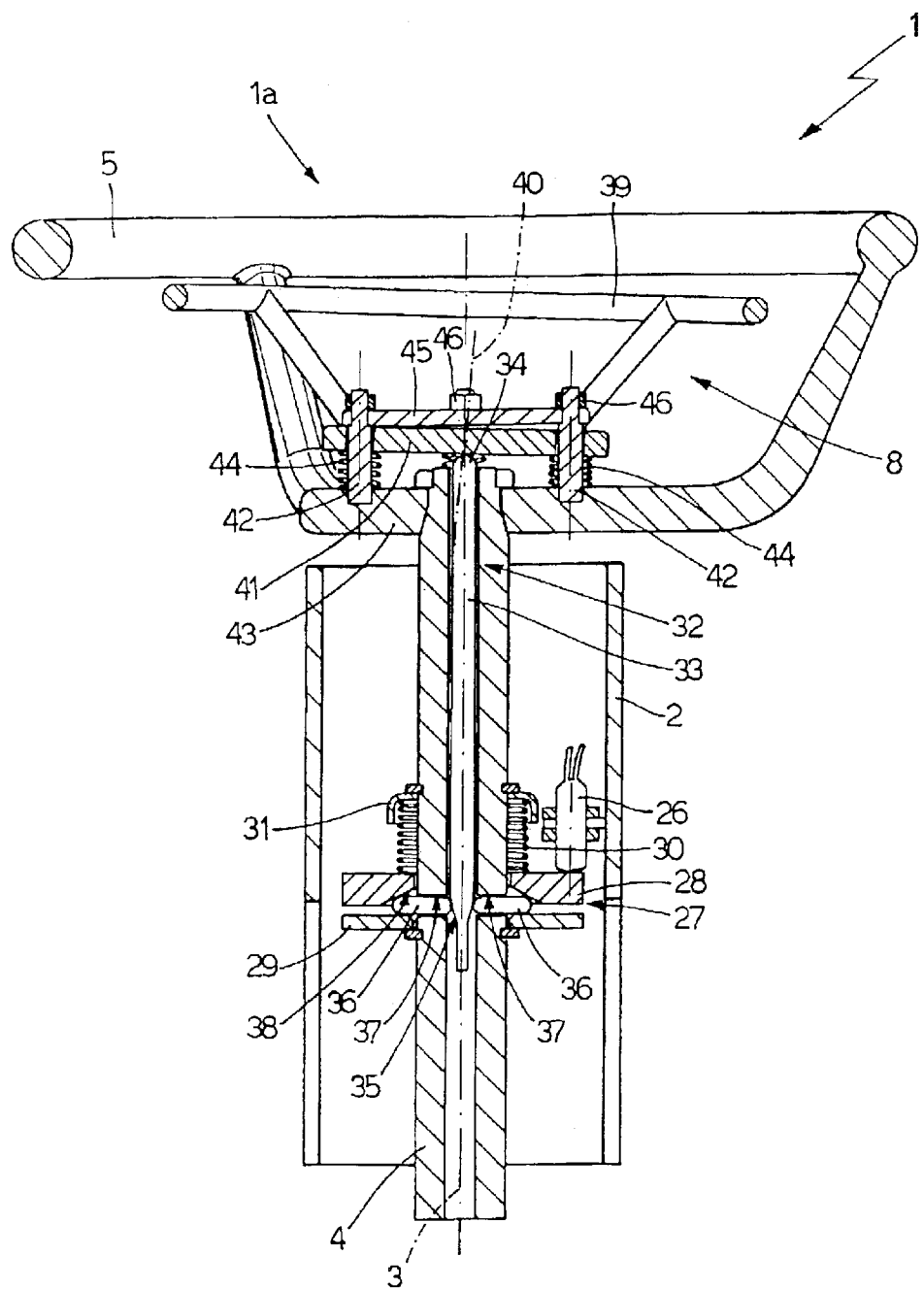
FIG. 6 is a longitudinal sectional view of the equipment of FIG. 4, illustrated in a lower operative position.

A second embodiment of the invention is illustrated in FIGS. 4, 5 and 6. The second embodiment differs from the first embodiment illustrated in FIGS. 1, 2 and 3 in that the control device 8 includes a reference member 27 having a flat annular cup 28. The flat cup 28 is disposed coaxial to the first longitudinal axis 3, and is mounted in such a way that the flat cup 28 can rotate and slide axially with respect to the steering transmission shaft 4. The flat cup 28 is normally biased in a lowered position (FIG. 5) by a spring 30. In the lowered position, the cup 28 is disposed in contact with an annular flange 29, which extends radially outward from an external surface of the shaft 4. The spring 30 is provided between the cup 28 and a collar 31 fixed to the external surface of the shaft 4 co-axially with respect to the first longitudinal axis 3.

The flat cup 28 is able to move along the first longitudinal axis 3, under the thrust of an actuator device 32 and against the bias of the spring 30, from the lowered position (FIG. 5) to a raised position (FIG. 6). In the raised position, the cup 28 is offset a given distance from the annular flange 29.

The actuating device 32 includes a rod 33, which is slidably mounted inside the hollow tubular steering transmission shaft 4 co-axially with respect to the first longitudinal axis 3. The rod 33 has a top end 34 projecting outward from the shaft 4. The rod 33 is provided with a bottom portion having an end 35 substantially shaped like a truncated cone. The truncated cone-shaped end 35 is designed to engage a plurality of radial pin elements 36. These radial pin elements 36 extend orthogonal to the first longitudinal axis 3, and are slidably mounted within respective radial bores 37 through the hollow shaft 4. The pin elements 36 engage a circumferential seat 38, which has substantially the shape of a radially orientated truncated cone in the flat cup 28.

The actuator device 32 further includes an actuator wheel 39, which has a second longitudinal axis 40. The actuator wheel 39 is disposed inside the steering wheel 5, and is provided with a central plate 41 orthogonal to the second longitudinal axis 40. The central plate 41 is slidably connected to a plurality of longitudinally parallel pins 42, which extend upward from a central hub 43 of the steering wheel 5. The pins 42 are circumferentially and uniformly distributed about the first longitudinal axis 3. In the lower or inoperative position as shown in FIG. 5, the central plate 41 contacts or abuts the top end 34 of the rod 33 without exerting any pressure on the rod 33.

The actuator wheel 39 is normally disposed in a resting position (FIG. 5) The steering wheel 5 and the actuator wheel 39 (as well as the first longitudinal axis 3 and the second longitudinal axis 40) are positioned coaxial with respect to one another by the thrust of a plurality of springs 44. Each spring 44 is fitted on a corresponding longitudinally parallel pin 42. The springs 44 are disposed between the central plate 41 and the central hub 43 of the steering wheel. The actuator wheel 39 is thus able to move against the bias of the springs 44 under an asymmetrical force with respect to the first longitudinal axis 3. An asymmetrical force, for example, may be generated by one hand of the vehicle operator. The actuator wheel 39 moves from the lower or resting position (FIG. 5) to a raised or operative position (FIG. 6), in which the first longitudinal axis 3 forms an angle with respect to the second longitudinal axis 40, i.e. other than 0°.

During the displacement between the resting and operative positions, the actuator wheel 39 co-operates with a cylindrical top plate 45. The top plate 45 is positioned over the smaller or restricted top portions of the pins 42 and is clamped axially on the pins 42 by means of corresponding locknuts 46. As such, the top plate 45 forms a fixed thrust plate for the control plate 41 when the plate 41 is moved from the rest position.

With reference to FIG. 6, when the actuator wheel 39 is moved by the vehicle operator into the operative position against the bias of the springs 44, the control plate 41 tilts and pushes against the top portion 34 of the rod 33. As a result, the rod 33 is pushed lower, thereby pushing the radial pin elements 36 outward to an extracted position. Under the downward thrust of the bottom portion 35 of the rod, the flat cup 28 is raised up toward an upward position against the bias of the spring 30.

Conversely, with reference to FIG. 5, when the actuator wheel 39 is released by the vehicle operator, the wheel is displaced into the resting position under the bias of the springs 44. The flat cup 28 is disposed in the lowered position under the thrust of the spring 30, whereby the radial pins 36 are displaced toward a retracted position. Thus the actuating rod 33 is raised so as to maintain the top end 34 in contact with the central plate 41.

Similar to the first embodiment, a sensor 26 is operable to detect the changes in the position of the flat cup 28 so as to provide a signal to a control unit for selecting between "conventional steering" and "fast steering".

In connection with the description above for both embodiments, the following features are noted. Due to the symmetrical design of the embodiments, the actuator wheels 18 and 39 can be displaced into the operative position by means of an unsymmetrical force exerted on any point of the actuator wheels 18 and 39. The force can be upward (FIG. 3) or downward (FIG. 6), and thus avoids the need for the vehicle operator to release the steering wheel 5, even with just one hand. The steering ratio is switched to the "conventional steering" value k1 when the cups 14 and 28 are positioned in their lowered positions and to the "fast steering" value k2 when the cups 14 and 28 are disposed in their raised positions. Due to the simultaneous angular movement of the steering wheel 5 and the respective actuator wheel 18 or 39 while steering, the vehicle operator is able to push or pull the actuator wheel 18 or 39 while continuing to steer with steering wheel 5. The vehicle operator can continue to steer without any radial sliding movement of his hand over the actuator wheels 18 and 39.

According to a further embodiment (not illustrated), the sensor 26 can be replaced by a wireless sensor designed to detect a displacement of annular cups 14 or 28 along the first longitudinal axis 3. A radio-wave transmission system including a receiving member is fixed to the steering column 2 and an emitter member is fixed to the steering wheel 5. The radio-wave transmission system is designed to transmit to the receiving member a signal from the wireless sensor. In particular, the emitter member may include a transponder.

What is claimed is:

1. Steering equipment for a work vehicle comprising:
   a steering unit including a steering column having a first longitudinal axis, a steering transmission shaft mounted inside the steering column for rotating about said first axis, a steering wheel mounted on the transmission shaft and a control device for actuating a steering operating unit, the control device further comprising:
   a reference member disposed on the steering unit to move along said first longitudinal axis;
   actuator means for displacing the reference member along the first axis; and
   sensor means for detecting a position of the reference member along the first longitudinal axis, wherein the sensor means is mounted on the steering column in a position substantially facing said reference member.

2. The steering equipment according to claim 1, the actuator means further comprising:
   a actuating member having a second longitudinal axis, the actuating member being movable between a resting position, in which the actuating member and the reference member are substantially coaxial with respect to one another, and an operative position, in which the first longitudinal axis and the second longitudinal axis form an angle other than zero with respect to one another.

3. The steering equipment according to claim 2, said control device further comprising:
   first thrust means operable to displace the actuating member from said operative position to said resting position, the actuating member being able to move from said resting position to said operative position by a force exerted asymmetrically with respect to the first and second axis.

4. The steering equipment according to claim 3, wherein said first thrust means are coil springs designed to maintain the actuating member in said resting position when not engaged by said asymmetrical force.

5. The steering equipment according to claim 4, said control device further comprising:

an end-of-travel element extending in a transverse direction with respect to said first axis;

the reference member being movable between a first position, in which the reference member is disposed substantially in contact with the end-of-travel element, and a second position, in which the reference member is offset a given distance from the end-of-travel element.

6. The steering equipment according to claim 5, said control device further comprising:

second thrust means operable to displace the reference member into said first position upon a displacement of the actuating member into said resting position.

7. The steering equipment according to claim 6, the actuating member comprising:

a central hub operable to engage said reference member, the hub having a plurality of fixed pin elements extending substantially parallel to the second longitudinal axis; and the end-of-travel element having a plurality of pin seats, each seat disposed and shaped to receive a respective fixed pin element when the actuating member is moved to the resting position.

8. The steering equipment according to claim 6 wherein the transmission shaft is a hollow tube and said control device comprises:

a rod slidably mounted inside the hollow transmission shaft;

a plurality of radial pin elements extending orthogonal to said first longitudinal axis and being slidably mounted through said transmission shaft; and said rod having a free end engaged by said actuating member and an opposing end portion having the shape of a truncated cone, the opposing end operable to engage said radial pin elements for displacing the reference member into said second position upon movement of the actuating member from the resting position to the operative position.

9. The steering equipment according to claim 8, said control device further comprising:

an electronic control unit operable to control operation of said steering operating unit according to a signal from said sensor means.

10. The steering equipment according claim 9, wherein said sensor means comprises a proximity sensor.

11. In a work vehicle having a steering unit including a steering column having a first longitudinal axis, a steering transmission shaft mounted inside the steering column for rotating about said first axis, a steering wheel mounted on the transmission shaft, and a control device for actuating a steering operating unit, the control device comprising:

a reference member disposed on the steering unit and movable along said first longitudinal axis;

actuator means for displacing the reference member along the first longitudinal axis;

a sensor for detecting a position of the reference member along the first longitudinal axis; and the actuator means further comprising an actuating member having a second longitudinal axis, the actuating member being operable to move between a resting position, in which the actuating member and reference member are substantially coaxial with respect to one another, and an operative position, in which the first and second longitudinal axis form an angle other than zero with respect to one another.

12. The work vehicle according to claim 11, wherein said actuator means further comprise:

first thrust means operable to displace the actuating member from said operative position to said resting position, the actuating member movable from said resting position to said operative position under a force exerted asymmetrically with respect to said first and second longitudinal axis.

13. The work vehicle according to claim 12, wherein said first thrust means are elastic springs operable to maintain the actuating member in said resting position when not engaged by said asymmetrical force.

14. The work vehicle according to claim 13, wherein said control device further comprises:

an end-of-travel element extending in a transverse direction with respect to said first axis, wherein the reference member is operable to move between a first position, in which the reference member is disposed substantially in contact with the end-of-travel element, and a second position, in which the reference member is offset a given distance from the end-of-travel element.

15. The work vehicle according to claim 14, wherein the actuator means further comprises:

second thrust means operable to displace the reference member to the first position upon displacement of the actuating member into said resting position.

16. The work vehicle according to claim 14, wherein the actuating member has a central hub operable to engage said reference member, the hub having a plurality of fixed pin elements extending substantially parallel to the second axis; and the end-of-travel element having a plurality of pin seats, each pin seat disposed and shaped to receive a respective fixed pin element when the actuating member is positioned in the resting position.

17. The work vehicle according to claim 14, wherein said steering transmission shaft is a hollow tube and said control device further comprises:

a rod slidably mounted inside the hollow transmission shaft;

a plurality of radial pin elements extending orthogonal to said first axis and slidably mounted through said transmission shaft; and said rod having a free end engaged by said actuating member and an opposed end portion having a shape of a truncated cone, the opposing end operable to engage said radial pin elements for displacing the reference member to said second position upon movement of the actuating member from the resting position to the operative position.

18. Steering equipment for a work vehicle comprising:

a steering unit including a steering column having a first longitudinal axis, a steering transmission shaft mounted inside the steering column for rotating about said first axis, and a steering wheel mounted on the transmission shaft for controlling the steering of at least one wheel of the vehicle;

hydraulic means disposed between the steering unit and the vehicle wheel;

a control device acting on said hydraulic means for varying a ratio between an angle of rotation of the steering wheel about the first axis and an angle of steering of the wheel; and the control device further comprising:

a reference member disposed on the steering unit and movable along said first axis;

an actuator mechanism for moving the reference member along the first axis; and sensor means for detecting a position of the reference member along the first axis, said sensor means being mechanically disconnected from said reference member.

19. The steering equipment according to claim 18, wherein the sensor means comprises a proximity sensor mounted on the steering column in a position substantially facing said reference member.

20. The steering equipment according to claim 18, wherein said sensor means comprises:
   a sensor member operable to detect a displacement of the reference member along the first axis; and
   a radio-wave transmission system having a receiving member fixed to the steering column and an emitter member fixed to the steering wheel to transmit to the receiving member a displacement signal from the sensor member.

\* \* \* \* \*